(12) United States Patent
Watanabe et al.

(10) Patent No.: US 11,283,801 B2
(45) Date of Patent: Mar. 22, 2022

(54) ACCOUNT IDENTIFICATION APPARATUS, ACCOUNT IDENTIFICATION METHOD, AND ACCOUNT IDENTIFICATION PROGRAM

(71) Applicant: NIPPON TELEGRAPH AND TELEPHONE CORPORATION, Tokyo (JP)

(72) Inventors: Takuya Watanabe, Musashino (JP); Eitaro Shioji, Musashino (JP); Mitsuaki Akiyama, Musashino (JP); Takeshi Yagi, Musashino (JP); Takeo Hariu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 162 days.

(21) Appl. No.: 16/633,584

(22) PCT Filed: May 24, 2018

(86) PCT No.: PCT/JP2018/020028
§ 371 (c)(1),
(2) Date: Jan. 24, 2020

(87) PCT Pub. No.: WO2019/026399
PCT Pub. Date: Feb. 7, 2019

(65) Prior Publication Data
US 2020/0213314 A1    Jul. 2, 2020

(30) Foreign Application Priority Data

Aug. 3, 2017  (JP) .............................. JP2017-150858

(51) Int. Cl.
*H04L 29/06*    (2006.01)

(52) U.S. Cl.
CPC .............. *H04L 63/10* (2013.01); *H04L 63/20* (2013.01)

(58) Field of Classification Search
CPC ..... H04L 63/10; H04L 63/20; H04L 43/0864; H04L 63/14; G06F 13/00
(Continued)

(56) References Cited

U.S. PATENT DOCUMENTS 9,172,705 B1 * 10/2015 Kong ...................... H04L 63/10
9,173,101 B1 * 10/2015 Angelov ............... H04W 12/06
(Continued)

FOREIGN PATENT DOCUMENTS

JP        2015-225613 A      12/2015
JP        2017-084049 A       5/2017

OTHER PUBLICATIONS

International Search Report and Written Opinion dated Aug. 21, 2018 for PCT/JP2018/020028 filed on May 24, 2018, 6 pages including English Translation of the International Search Report.
(Continued)

*Primary Examiner* — Kambiz Zand
*Assistant Examiner* — Aubrey H Wyszynski
(74) *Attorney, Agent, or Firm* — Xsensus LLP

(57) ABSTRACT

An account identification apparatus sets browsing authority for each of accounts such that browsing permission/prohibition is different for each of Web pages. Furthermore, the account identification apparatus causes a user terminal having accessed a predetermined Web site to transmit a request to each of the Web pages so as to acquire information about browsing permission/prohibition for each of the Web pages with regard to the user terminal and uses the acquired information about browsing permission/prohibition to identify an account with which the user terminal has logged in.

6 Claims, 9 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2009/0300020 | A1* | 12/2009 | Chen | ................... G06F 21/6218 |
| 2014/0358668 | A1* | 12/2014 | Fredinburg | ............ G06Q 30/02 |
| | | | | 705/14.43 |
| 2017/0024577 | A1* | 1/2017 | Prabaker | ................. G06F 16/00 |
| 2017/0177627 | A1* | 6/2017 | Singh | .................... G06F 16/353 |

OTHER PUBLICATIONS

Bortz, A., et al., "Exposing Private Information by Timing Web Applications," WWW '07: Proceedings of the 16th International conference on World Wide Web, May 2007, 8 pages.

Nikiforakis, N., et al., "Cookieless Monster: Exploring the Ecosystem of Web-Based Device Fingerprinting," 2013 EEE Symposium on Security and Privacy, May 2013, pp. 541-555.

W3C., "2011. 5.11.2 The link pseudo-classes: :link and visited," Retrieved from the Internet URL: https://www.w3.org/TR/CSS2/selector.html#link-pseudo-classeson Jul. 28, 2017, 1 page.

Wondracek, G., et al., "A Practical Attack to De-Anonymize Social Network Users," 2010 IEEE Symposium on Security and Privacy, May 2010, 16 pages.

\* cited by examiner

FIG.2

| IDENTIFICATION-TARGET ACCOUNT | IDENTIFICATION BIT SEQUENCE | S1 | S2 | S3 |
|---|---|---|---|---|
| Alice | 000 | ◴ | ◴ | ◴ |
| Bob | 001 | ◴ | ◴ | ⊘ |
| Carol | 010 | ◴ | ⊘ | ◴ |
| Dave | 011 | ◴ | ⊘ | ⊘ |
| Erin | 100 | ⊘ | ◴ | ◴ |
| Frank | 101 | ⊘ | ◴ | ⊘ |
| Grace | 110 | ⊘ | ⊘ | ◴ |
| Heidi | 111 | ⊘ | ⊘ | ⊘ |

S1, S2, S3: BLOCKING ACCOUNT

⊘ BLOCKING

◴ NON-BLOCKING (DEFAULT)

ACCOUNT IDENTIFICATION APPARATUS, ACCOUNT IDENTIFICATION METHOD, AND ACCOUNT IDENTIFICATION PROGRAM

CROSS-REFERENCE TO RELATED APPLICATIONS

The present application is based on PCT filing PCT/JP2018/020028, filed May 24, 2018, which claims priority to JP 2017-150858, filed Aug. 3, 2017, the entire contents of each are incorporated herein by reference.

FIELD

The present invention relates to an account identification apparatus, an account identification method, and an account identification program.

BACKGROUND

The technology for uniquely identifying a user who has visited various Web sites is called tracking. The tracking allows the estimation of the user's hobbies and interests and it is used for, for example, the content recommendation for displaying the appropriate content for each user based on the estimated hobbies and interests or the targeting advertisement for displaying the advertisement corresponding to the user's hobbies and interests.

A technique widely used to perform tracking is, for example, third party Cookie. Here, Cookie is the technology for storing a status in a Web site and a Web browser after the transition of a page. As for third party Cookie, an advertising practitioner, etc. issues Cookie and handles the same Cookie on various Web sites so as to identify a user across multiple Web sites.

Furthermore, the technology called Web Browser Fingerprint (see Non-Patent Literature 1) generates the information for identifying a user based on information such as the type of font or plug-in installed in a browser, the resolution of a screen, or User Agent. The use of them makes it possible to perform tracking eve when third party Cookie is disabled due to a function of the browser.

In either third party Cookie or Web Browser Fingerprint, although it is possible to determine the identical device, it is difficult to acquire the attribute of a user, such as user's name, sex, or age. Furthermore, as identification information is given by each browser, it is difficult to identify the identical user with different devices, such as a PC and a smartphone.

Other information for performing tracking on a user, estimating hobbies and interests, and the like, includes the social account owned by an individual user. The social account is an account in a social Web service, such as SNS or microblog.

A social account is associated with attribute information on a user, such as name, sex, or age, and a user uses the same social account on a daily basis with different devices, such as a PC and a smartphone, in a cross-sectional manner. Therefore, the social account of a Web visitor is identified so that it is possible to identify the identical user even with different devices.

Thus, the user's attribute, such as sex or age, is extracted based on the social account information on the user so that the content recommendation or the targeting advertisement may be performed with higher accuracy. In addition, in a case where a user uses the identical social account with multiple devices, such as a PC and a smartphone, the identical user may be tracked with different devices.

As the above-described method for identifying a social account, there is a known method in which, for example, a visit history to a social media page is acquired by using the standard of the cascade style sheet (hereinafter referred to as CSS) for changing the description of a URL hyperlink displayed on the browser before and after a specific URL is visited and the social account of a user is identified based on the history (see Non-Patent Literature 2).

CITATION LIST

Non-Patent Literature

Non-Patent Literature 1: Nikiforakis, Nick, et al. "Cookieless monster: Exploring the ecosystem of web-based device fingerprinting." Security and privacy (SP), 2013 IEEE symposium on. IEEE, 2013.
Non-Patent Literature 2: Wondracek, Gilbert, et al. "A practical attack to de-anonymize social network users." Security and Privacy (SP), 2010 IEEE Symposium on. IEEE, 2010.
Non-Patent Literature 3: W3C. 2011. 5.11.2 The link pseudo-classes: :link and :visited. [searched on the 28th of July, 2017], the Internet <https://www.w3.org/TR/CSS2/selector.html #link-pseudo-classes>

SUMMARY

Technical Problem

However, the background art has a problem in that it is difficult to identify a social account in a situation where it is not possible to acquire a Web-site visit history. For example, the above-described conventional method for identifying a social account depends on the technology for acquiring the Web-page visit history of a user due to the standard of the CSS for changing the description of a URL link before and after a visit.

As a Web-page visit history is related to more serious personal information, such as the usage situation of a bank-related Web site, other than a social account, the technology for acquiring a visit history is considered problematic, and measures have been taken in the CSS version 2.1 in 2011 (see Non-Patent Literature 3). Therefore, this technique is not applicable to the major browsers.

Solution to Problem

An account identification apparatus includes: a setting unit that sets browsing authority for each of accounts such that browsing permission/prohibition is different for each of Web pages; an acquiring unit that causes a terminal having accessed a predetermined Web site to transmit a request to each of the Web pages so as to acquire information about browsing permission/prohibition for each of the Web pages with regard to the terminal; and an identifying unit that uses the information about browsing permission/prohibition acquired by the acquiring unit to identify an account with which the terminal has logged in.

An account identification method implemented by an account identification apparatus, the account identification method includes: a setting step of setting browsing authority for each of accounts such that browsing permission/prohibition is different for each of Web pages; an acquiring step of causing a terminal having accessed a predetermined Web site to transmit a request to each of the Web pages so as to acquire information about browsing permission/prohibition for each of the Web pages with regard to the terminal; and an identifying step of using the information about browsing permission/prohibition acquired at the acquiring step to identify an account with which the terminal has logged in.

An account identification program causing a computer to execute: a setting step of setting browsing authority for each of accounts such that browsing permission/prohibition is different for each of Web pages; an acquiring step of causing a terminal having accessed a predetermined Web site to transmit a request to each of the Web pages so as to acquire information about browsing permission/prohibition for each of the Web pages with regard to the terminal; and an identifying step of using the information about browsing permission/prohibition acquired at the acquiring step to identify an account with which the terminal has logged in.

Advantageous Effects of Invention

According to the present invention, there is an advantage such that it is possible to identify a social account even in a situation where it is difficult to acquire a Web-site visit history.

BRIEF DESCRIPTION OF DRAWINGS

FIG. 2 is a diagram that illustrates an example of the information stored in a social account database.

DESCRIPTION OF EMBODIMENTS

With reference to the drawings, an embodiment of an account identification apparatus, an account identification method, and an account identification program according to the subject application is described below in detail. Furthermore, the account identification apparatus, the account identification method, and the account identification program according to the subject application are not limited to the embodiment.

First Embodiment

In the following embodiment, a configuration of the account identification apparatus according to the first embodiment and the flow of a process of the account identification apparatus are sequentially described, and an advantageous effect of the first embodiment is finally described.

[Configuration of the Account Identification Apparatus]

Figure 1:
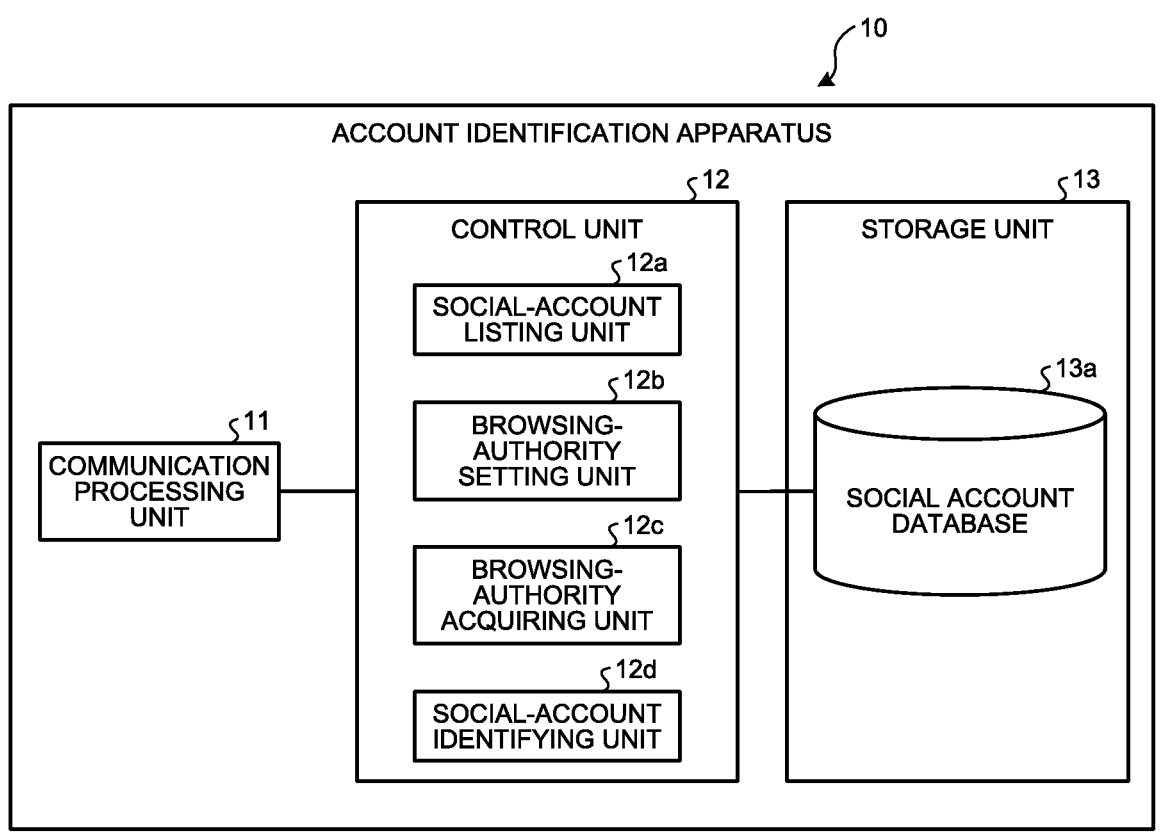
FIG. 1 is a block diagram that illustrates a configuration of an account identification apparatus according to a first embodiment.

With reference to FIG. 1, a configuration of an account identification apparatus 10 according to the first embodiment is described. FIG. 1 is a block diagram that illustrates the configuration of the account identification apparatus according to the first embodiment. As illustrated in FIG. 1, the account identification apparatus 10 includes a communication processing unit 11, a control unit 12, and a storage unit 13. A process of each of the units is described below.

The communication processing unit 11 controls the communications regarding various types of information that is communicated with a user terminal. For example, the communication processing unit 11 receives, from a user terminal, an access request to a Web site.

Furthermore, the storage unit 13 stores data and programs needed for various types of processing by the control unit 12 and, particularly, includes a social account database 13a that is closely related to the present invention. For example, the storage unit 13 is a semiconductor memory device, such as a RAM (Random Access Memory) or a flash memory (Flash Memory), or a storage device, such as a hard disk or an optical disk.

The social account database 13a relates and stores the target account to be identified, the bit sequence that is a bit sequence having a length of N digits assigned to each account and that is a unique identifier, and the information about the browsing authority setting of each account with respect to a blocking account.

Here, by using the example of FIG. 2, an example of the information stored in the social account database 13a is described. FIG. 2 is a diagram that illustrates an example of the information stored in the social account database. As illustrated in FIG. 2, for example, the social account database 13a relates and stores "identification-target account" indicating the target account name to be identified, "identification bit sequence" that is the bit sequence including three digits to uniquely identify an account, and the browsing authority for blocking accounts "S1", "S2", and "S3" with respect to each account.

A description is given by using, for example, FIG. 2; the social account database 13a relates and stores the identification-target account "Dave" and the identification bit sequence "011". Furthermore, the social account database 13a stores the setting of browsing permission (described as non-blocking in FIG. 2) for the blocking account S1 with regard to the identification-target account "Dave" but stores the setting of browsing prohibition (described as blocking in FIG. 2) for S2 and S3. Moreover, a social-account listing unit 12a described later generates an identification bit sequence, and a browsing-authority setting unit 12b sets the browsing authority for a blocking account, which are described later in detail.

The control unit 12 includes an internal memory that stores programs defining various procedures, and the like, and required data, performs various processes by using them, and particularly as the ones that are closely related to the present invention, includes the social-account listing unit 12a, the browsing-authority setting unit 12b, a browsing-authority acquiring unit 12c, and a social-account identifying unit 12d.

Among them, the social-account listing unit 12a and the browsing-authority setting unit 12b are processing units that perform a process at a "preparatory step" which needs to be previously performed before the user to be identified visits a Web site. Furthermore, the browsing-authority acquiring unit 12c and the social-account identifying unit 12d are processing units that perform a process at an "execution step" which is performed when the user to be identified visits a Web site. Each unit is described below.

The social-account listing unit 12a lists the target account to be identified. Specifically, the social-account listing unit 12a lists the target account to be identified among the social accounts registered in a social Web service. As the method for listing an account, for example, there are various methods such as the method for recursively searching for a user having friendship with a certain user, or the method using a user search function.

For example, the social-account listing unit 12a may search for as many accounts as possible which are present in a social Web service so as to list several tens of millions or several hundreds of millions or may collect and list accounts corresponding to the attribute (e.g., a politician, a public figure, or a person belonging to a specific university or company) of the user to be covered.

Furthermore, specific examples of the social Web service include, but are not limited to, Facebook (registered trademark), Twitter (registered trademark), or Tumblr (registered trademark). Furthermore, the social-account listing unit 12a assigns an identification bit sequence, which is a bit sequence having a length of N digits and which is a unique identifier, to a listed account. The specific value of N may be determined in accordance with a number M of target accounts to be identified.

As a bit sequence having N digits has $2^N$ ways, the number of users to which an identification bit sequence may be assigned, i.e., the maximum possible number of M, is $2^N$. The social-account listing unit 12a generates the list of the thus listed account and the corresponding identification bit sequence and stores it in the social account database 13a.

The browsing-authority setting unit 12b sets the browsing authority for each of accounts such that browsing permission/prohibition is different for each Web page. Specifically, the browsing-authority setting unit 12b sets the browsing authority for each of the identification-target social accounts listed by the social-account listing unit 12a such that browsing permission/prohibition is different for each Web page. Examples of the way of setting the browsing authority for an individual social account include a user blocking function of a social Web service.

For example, the browsing-authority setting unit 12b prepares N social Web pages for which browsing permission or browsing prohibition may be optionally set with regard to an account included in the social account database 13a. Furthermore, the browsing-authority setting unit 12b sets the browsing authority for each account in accordance with the value of each digit of the identification bit sequence assigned by the social-account listing unit 12a such that browsing permission/prohibition is different for each social Web page. For example, with regard to the N-digits identification bit sequence assigned by the social-account listing unit 12a, the browsing-authority setting unit 12b maps one social Web page to one digit and sets browsing permission when the bit of the mapped digit is 0 and sets browsing prohibition when it is 1 with regard to all the M accounts in the social account database 13a. Furthermore, conversely, browsing prohibition may be set for 0 and browsing permission may be set for 1.

The browsing-authority acquiring unit 12c causes the user terminal having accessed a predetermined Web site to transmit a request to each Web page so as to acquire the information about browsing permission/prohibition for each Web page with regard to the user terminal. For example, the browsing-authority acquiring unit 12c acquires the status of browsing permission/prohibition as to whether the browsing is permitted or prohibited from the N pages prepared by the browsing-authority setting unit 12b with regard to the account owned by the user who has visited a Web site.

Here, examples of the way of acquiring the status as to whether browsing is permitted or prohibited include a method for causing a visitor to transmit a request to the N pages prepared by JavaScript (registered trademark), or the like, and determining the browsing authority based on a difference in the response time. For example, even in a situation where it is difficult for a Web site administrator to directly acquire the information such as the account name owned by the user who has visited a Web site, it is possible to use, for example, the method using a difference in the time required from a request until a response as long as the status of browsing permission/prohibition is acquired.

In the example described below, the browsing authority, which is set at the preparatory step, is determined by using the time required from a request until a response. For example, as the information about browsing permission/prohibition for each Web page, the browsing-authority acquiring unit 12c acquires the time required after a request is transmitted to each Web page by the user terminal until a response is received.

Originally, a Web site administrator causes a Web site visitor to execute XMLHttpRequest of JavaScript, or the like, to transmit a request to a designated Web page so as to acquire the content received as a response. However, most of the social Web sites limit the acquisition of a response by a Web page having a different domain due to the Same-Origin Policy.

Therefore, it is difficult to directly acquire the content of a profile page of a blocking account present in a social Web site by using XMLHttpRequest, or the like. However, it is possible to acquire the time (hereafter referred to as RTT) required after a request is transmitted until a response is received with regard to a social Web service for which the limitation due to the Same-Origin Policy is enabled (Reference Literature 1: Andrew Bortz, Dan Boneh, and Palash Nandy. 2007. Exposing Private Information by Timing Web Applications. In Proceedings of the 16th International World Wide Web Conference (WWW)).

Figure 3:
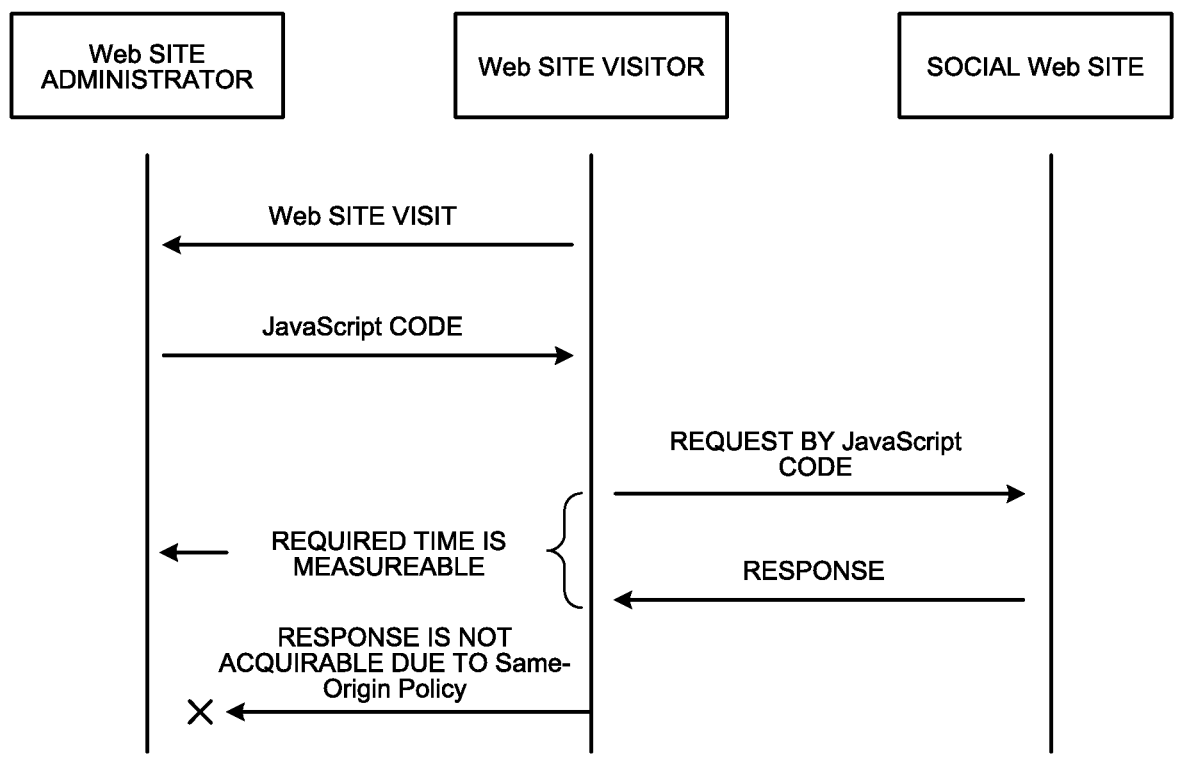
FIG. 3 is a diagram that illustrates the acquisition of an RTT (Round-Trip delay Time).

Here, the relationship among three parties, a Web site administrator, a Web site visitor, and a social Web site, is described with reference to FIG. 3. FIG. 3 is a diagram that illustrates the acquisition of the RTT. As illustrated in FIG. 3, when the terminal of the Web site visitor visits a Web site of the Web site administrator, a JavaScript code is transmitted to the terminal of the Web site visitor. Then, the terminal of the Web site visitor transmits a JavaScript request to the social Web site and receives a response to the request. Here, it is difficult for the Web site administrator to acquire a response due to the Same-Origin Policy. However, the RTT, which is the time required after a request is transmitted until a response is received, is measurable, and it is possible for the Web site administrator to acquire the measured RTT.

Figure 4:
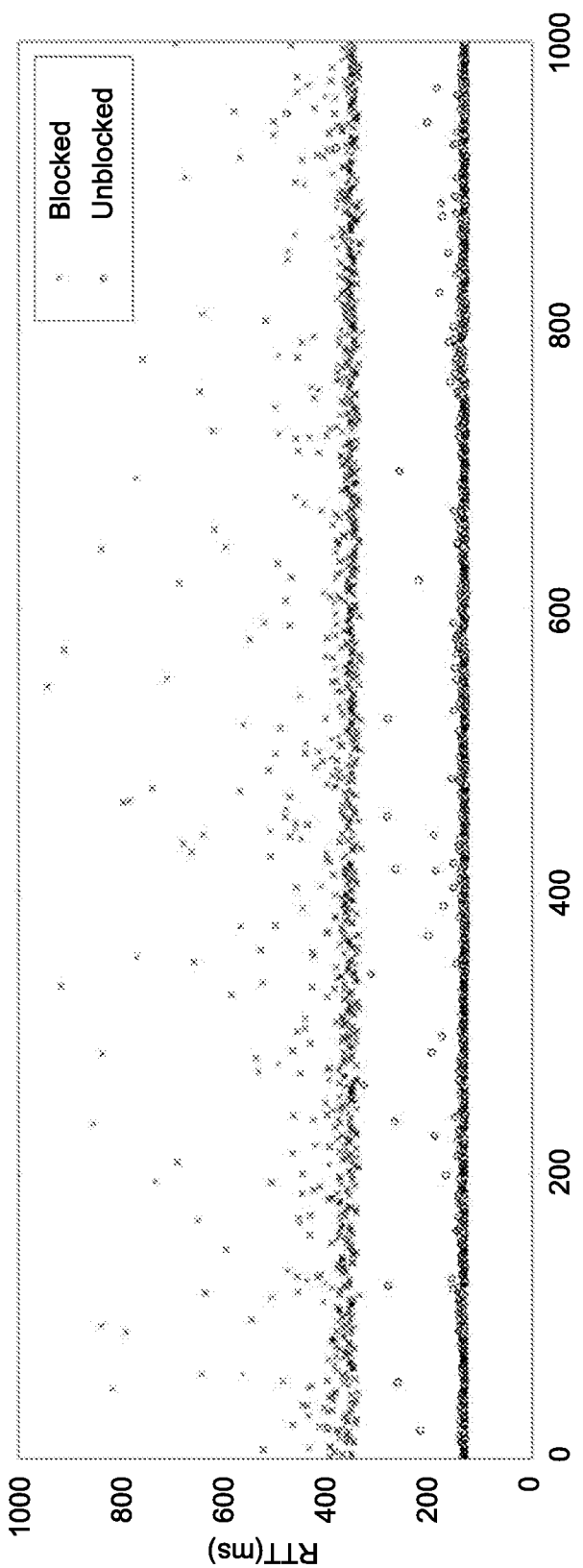
FIG. 4 is a diagram that illustrates an example of the RTT measured with regard to a profile page.
Figure 5:
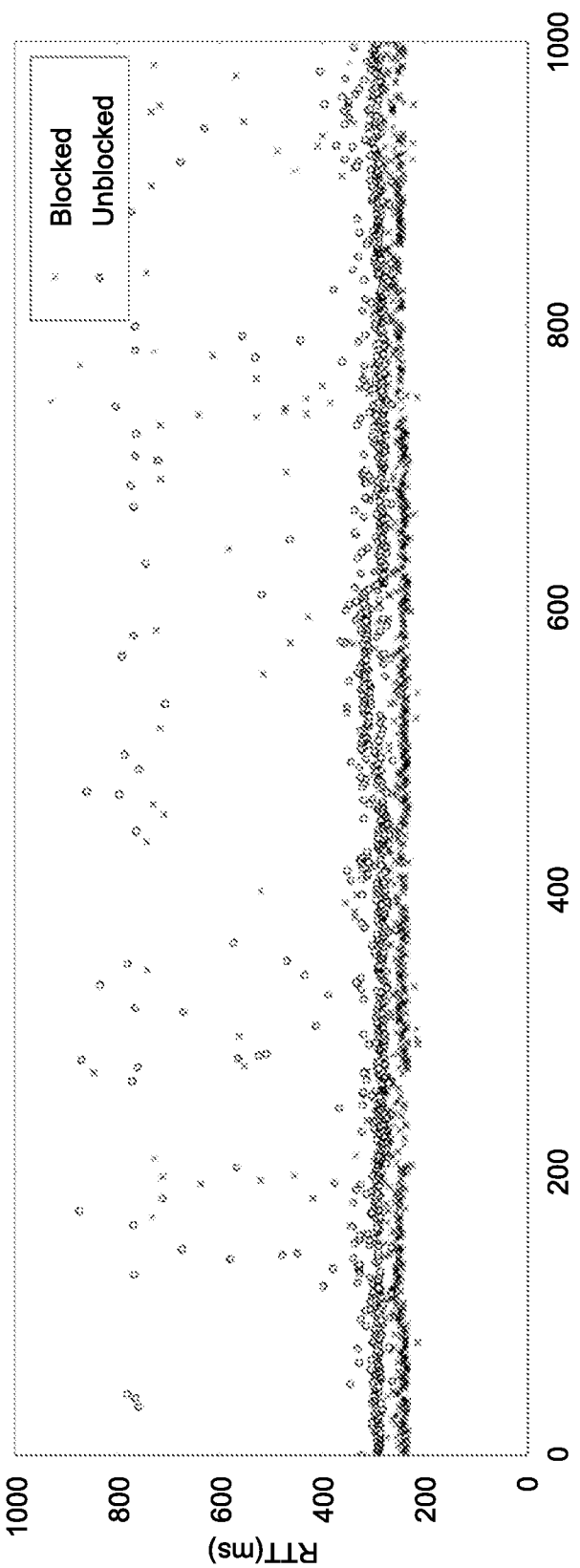
FIG. 5 is a diagram that illustrates an example of the RTT measured with regard to a profile page.

Here, by using FIG. 4 and FIG. 5, an example of the RTT measured with regard to a profile page is described. FIG. 4 and FIG. 5 are diagrams that illustrate examples of the RTT measured with regard to a profile page. The example of FIG. 4 is a scatter diagram of the RTTs measured 1000 times when the user who has logged in the Facebook account is caused to transmit a request to the user profile page on Facebook. Here, "Blocked" described in FIG. 4 is a blocked state, i.e., an RTT plot when a request is transmitted to a profile page for which browsing is prohibited, and "Unblocked" is an unblocked state, i.e., an RTT plot when a request is transmitted to a profile page for which browsing is permitted.

As it is understood from the example of FIG. 4, there is a significant difference between the RTTs of the Blocked and the Unblocked. By using these characteristics, the RTT is measured when a Web site visitor transmits a request to a specific profile page so that it is possible to assume that browsing is prohibited when the value tends to be large and browsing is permitted when the value tends to be small. Moreover, the difference in the RTT is caused due to a difference in the content size of a profile page when browsing is permitted and browsing is prohibited or due to a difference in a branching process within a server.

Furthermore, the same technique is applicable to a service other than Facebook so as to identify a social account as long as there is a significant difference in the RTT between a page for which browsing is permitted and a page for which it is prohibited. For example, the example of FIG. 5 is a scatter diagram of the RTTs measured 1000 times when the user who has logged in the Tumblr account is caused to transmit a request to the user profile page on Tumblr. In the example of FIG. 5, too, there is a significant difference in the RTTs of the Blocked and the Unblocked. Moreover, the long-short relationship of the RTTs may be reversed depending on a service.

Furthermore, various specific implementation methods are possible for estimating a blocking state based on the RTT. For example, first, RTTs are repeatedly measured ten times with regard to the profile page of an account Sp that blocks no users, and a list Tp of ten measured values is obtained. Then, RTTs are measured ten times with regard to the profile page of S1, and a list T1 of ten measured values is obtained. After Tp and T1 are compared, it may be determined that S1 blocks a visitor when a significant difference is recognized and does not block it when no significant difference is recognized. To test a significant difference, for example, the Mann-Whitney U test may be used.

The social-account identifying unit 12d uses the information about browsing permission/prohibition acquired by the browsing-authority acquiring unit 12c to identify the account with which the user terminal has logged in. Specifically, the social-account identifying unit 12d estimates browsing permission or browsing prohibition for each page with regard to the user terminal based on the RTT acquired by the browsing-authority acquiring unit 12c and, in accordance with an estimation result, identifies the account with which the user terminal has logged in.

For example, based on the status of the browsing authority obtained by the browsing-authority acquiring unit 12c, the social-account identifying unit 12d generates a visitor bit sequence that is a bit sequence in which the digit mapped to the page for which browsing is permitted is 0 and the digit mapped to the page for which browsing is prohibited is 1.

Then, the social-account identifying unit 12d matches the thus generated visitor bit sequence with an identification bit sequence in the social account database 13a. When the visitor bit sequence matches the identification bit sequence assigned to any account, the account is identified as the social account of the user who has visited the Web site.

Here, by using the specific example in FIG. 2, a specific procedure for identifying the social account of a Web site visitor is described. The account identification apparatus 10 causes a visitor to execute a JavaScript code, or the like, to transmit a request to three profile pages of S1, S2, and S3 so as to measure RTTs. When the RTTs for S1 and S2 have a large value and the RTT for S3 has a small value, it may be assumed that the visitor is blocked by S1 and S2 and is not blocked by S3. With the account identification apparatus 10, as browsing permission is related to 0 and browsing prohibition is related to 1, the visitor bit sequence may be identified as "110", i.e., Grace.

As described above, with the account identification apparatus 10 according to the first embodiment, the browsing authority is previously set for a listed account and a Web site visitor is caused to transmit a request to a designated Web page so that a social account may be identified by using an RTT. This makes it possible to identify a social account even in a situation where it is not possible to acquire a Web-site visit history.

Figure 6:
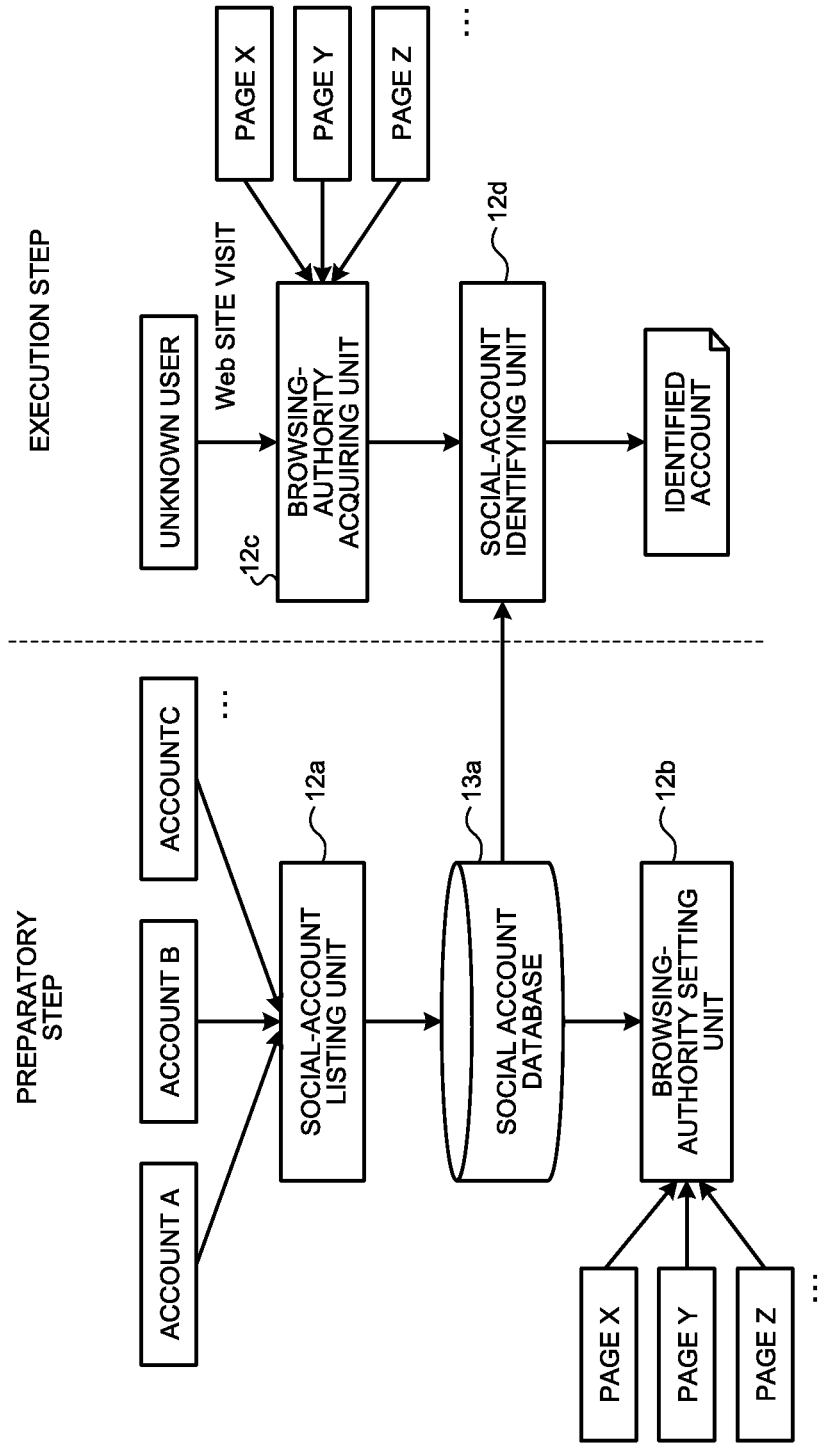
FIG. 6 is a diagram that illustrates a sequential flow of an account identification process.

Here, by using FIG. 6, the sequential flow of an account identification process performed by the account identification apparatus 10 according to the first embodiment is described. FIG. 6 is a diagram that illustrates the sequential flow of the account identification process. As illustrated in FIG. 6, at the preparatory step, the social-account listing unit 12a lists social accounts and assigns the identification bit sequence that is the bit sequence including a length of N digits to each social account. Here, the number of social accounts that may be represented by using the bit sequence of N digits is $2^N$.

Then, the browsing-authority setting unit 12b prepares the N pages for which the browsing authority may be set with regard to the social accounts and maps them to the respective digits of the identification bit sequence so as to set browsing permission for the digit with the value of 0 and set browsing prohibition for the digit with the value of 1.

Then, at the execution step, the browsing-authority acquiring unit 12c acquires the status as to whether browsing is permitted or prohibited for the above-described N pages with regard to an unknown Web site visitor. Then, based on the thus obtained status, the social-account identifying unit 12d generates a bit sequence (visitor bit sequence), in which the digit corresponding to the page for which browsing is permitted is 0 and the digit corresponding to the page for which browsing is prohibited is 1, and matches it with the identification bit sequence assigned at the preparatory step so as to identify it as any one of the social accounts.

[Flow of Process of the Account Identification Apparatus]

Figure 7:
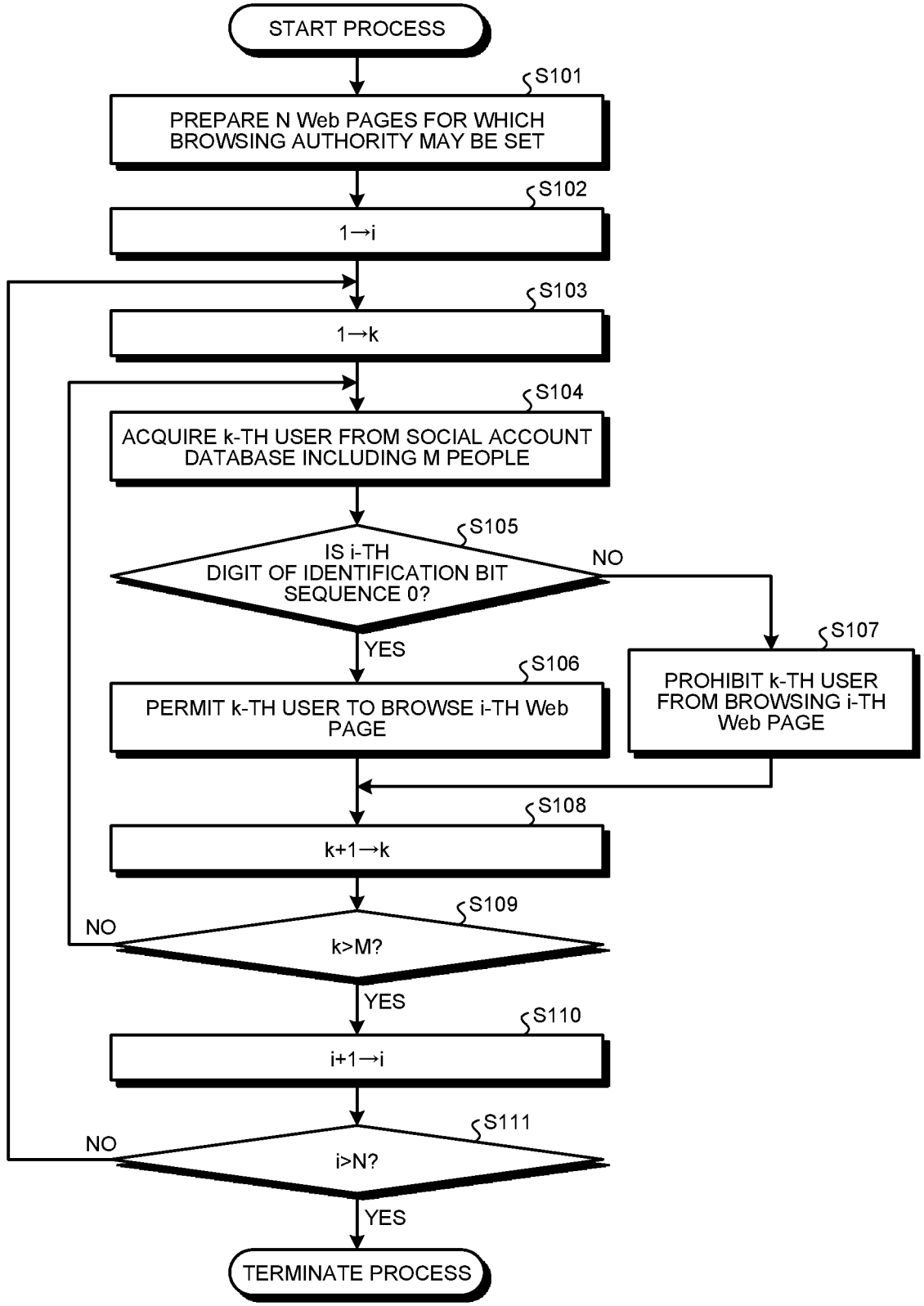
FIG. 7 is a flowchart that illustrates a process of a browsing-authority setting unit in the account identification apparatus according to the first embodiment.
Figure 8:
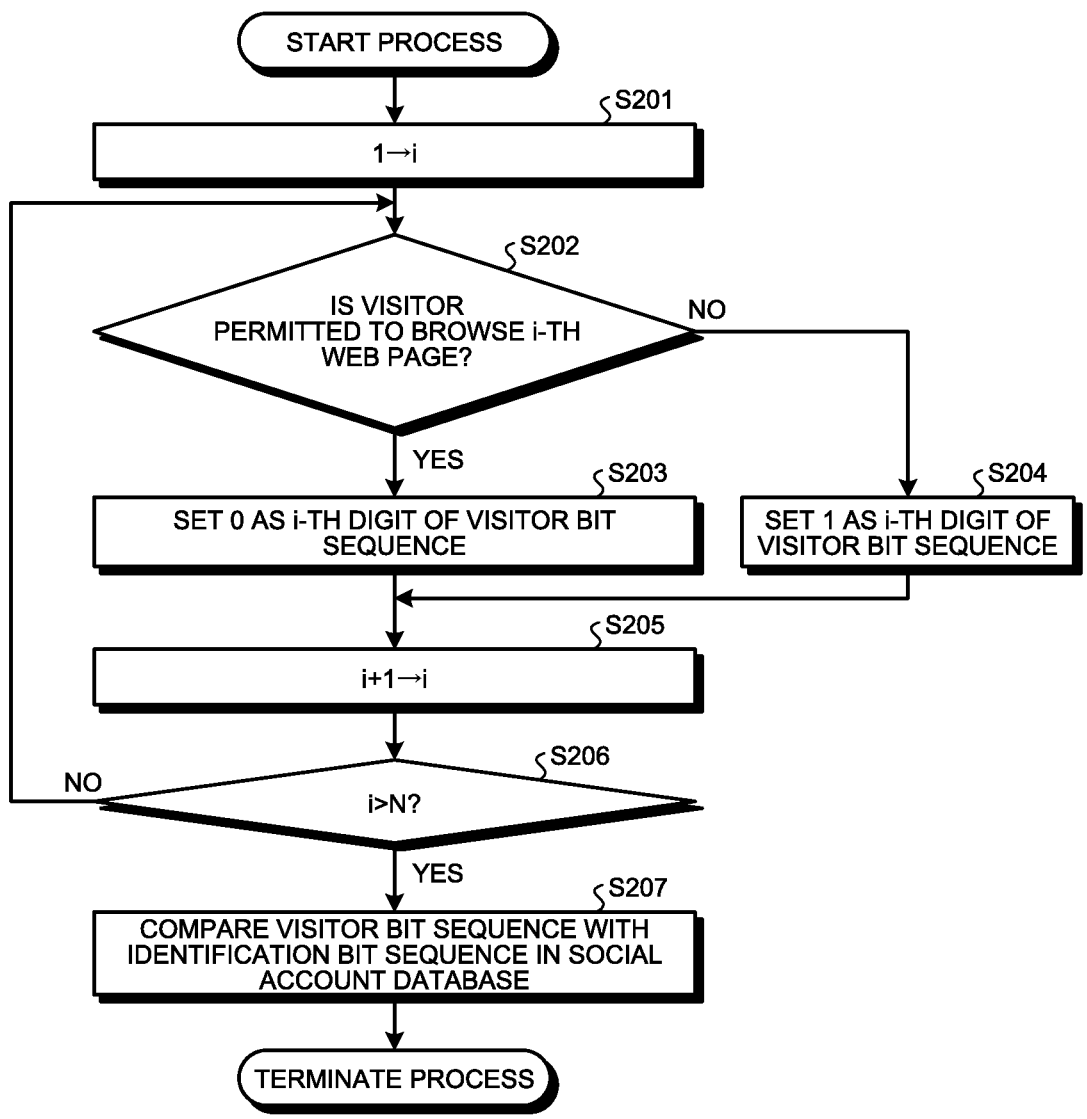
FIG. 8 is a flowchart that illustrates a process of a social-account identifying unit in the account identification apparatus according to the first embodiment.

Next, by using FIG. 7 and FIG. 8, the flow of a process of the account identification apparatus 10 according to the first embodiment is described. First, by using FIG. 7, a process of the browsing-authority setting unit 12b in the account identification apparatus 10 is described. FIG. 7 is a flowchart that illustrates a process of the browsing-authority setting unit in the account identification apparatus according to the first embodiment.

As illustrated in FIG. 7, the browsing-authority setting unit 12b of the account identification apparatus 10 prepares the N Web pages for which browsing authority may be set (Step S101). Then, the browsing-authority setting unit 12b sets "1", which is the default value, as i (Step S102) and sets "1", which is the default value, as k (Step S103).

Then, the browsing-authority setting unit 12b acquires the k-th user from the social account database 13a including the M people (Step S104) and determines whether the i-th digit of the identification bit sequence is 0 (Step S105). As a result, when it is determined that the i-th digit of the identification bit sequence is 0 (Yes at Step S105), the browsing-authority setting unit 12b configures the setting such that the k-th user is permitted to browse the i-th Web page (Step S106). Furthermore, when it is determined that the i-th digit of the identification bit sequence is not 0 (No at Step S105), the browsing-authority setting unit 12b configures the setting such that the k-th user is prohibited from browsing the i-th Web page (Step S107).

Then, the browsing-authority setting unit 12b increments the value of k by one (Step S108) and determines whether the value of k exceeds the value of M (Step S109). As a result, when it is determined that the value of k does not exceed the value of M (No at Step S109), the browsing-authority setting unit 12b returns to the process at Step S104 and repeats the process. Conversely, when it is determined that the value of k exceeds the value of M (Yes at Step S109), the browsing-authority setting unit 12b increments the value of i by one (Step S110) and determines whether the value of i exceeds the value of N (Step S111).

As a result, the browsing-authority setting unit 12b returns to the process at Step S103 and repeats the process when it is determined that the value of i does not exceed the value of N (No at Step S111) and terminates the process when it is determined that the value of i exceeds the value of N (Yes at Step S111).

Next, by using FIG. 8, a process of the social-account identifying unit 12d in the account identification apparatus 10 is described. FIG. 8 is a flowchart that illustrates a process of the social-account identifying unit in the account identification apparatus according to the first embodiment.

As illustrated in FIG. 8, the social-account identifying unit 12d sets "1", which is the default value, as i (Step S201) and determines whether a Web site visitor is permitted to browse the i-th Web page (Step S202). As a result, when it is determined that a Web site visitor is permitted to browse the i-th Web page (Yes at Step S202), the social-account identifying unit 12d sets 0 as the i-th digit of the visitor bit sequence (Step S203). Furthermore, when it is determined that the Web site visitor is not permitted to browse the i-th Web page (No at Step S202), the social-account identifying unit 12d sets 1 as the i-th digit of the visitor bit sequence (Step S204).

Then, the social-account identifying unit 12d increments the value of i by one (Step S205) and determines whether the value of i exceeds the value of N (Step S206). As a result, the browsing-authority setting unit 12b returns to the process at Step S202 and repeats the process when it is determined that the value of i does not exceed the value of N (No at Step S206) and, when it is determined that the value of i exceeds the value of N (Yes at Step S206), compares the visitor bit sequence with an identification bit sequence in the social account database 13a (Step S207) and terminates the process.

Advantage of the First Embodiment

Thus, the account identification apparatus 10 according to the first embodiment sets the browsing authority for each of accounts such that browsing permission/prohibition is different for each Web page. Then, the account identification apparatus 10 causes the user terminal, which has accessed a predetermined Web site, to transmit a request to each Web page, acquires the information about browsing permission/prohibition for each Web page with regard to the user terminal, and identifies the account with which the user terminal has logged in by using the acquired information about browsing permission/prohibition. Thus, with the account identification apparatus 10, it is possible to identify a social account even in a situation where it is difficult to acquire a Web-site visit history.

Thus, with regard to a Web site visitor, for example, the social account owned by the user may be identified. As the social account is associated with an attribute of the user, such as name, age, sex, or attended community, it may be used for the content recommendation for displaying the optimum content for a user or the targeting advertisement for displaying the optimum advertisement for a user in accordance with the attributes.

Furthermore, the account identification apparatus 10 according to the first embodiment lists the target account to be identified among the social accounts registered in a social Web service and sets different browsing authority for each Web page with regard to each of the listed target accounts to be identified. Thus, it is possible to automatically collect and list the target account to be identified.

Furthermore, the account identification apparatus 10 according to the first embodiment assigns an identification bit sequence, which is a bit sequence having a predetermined length and is a unique identifier, to each of the listed accounts and sets the browsing authority to each account in accordance with the value of each digit of the assigned identification bit sequence such that browsing permission/prohibition is different for each Web page. Thus, it is possible to easily set browsing for each account.

Furthermore, as the information about browsing permission/prohibition for each Web page, the account identification apparatus 10 according to the first embodiment acquires the RTT that is the time required after a request is transmitted to each Web page by the user terminal until a response is received. Then, the account identification apparatus 10 estimates browsing permission or browsing prohibition for each page with regard to the user terminal in accordance with the acquired RTT and, based on an estimation result, identifies the account with which the user terminal has logged in. Thus, the account identification apparatus 10 makes it possible to easily determine the status of browsing permission/prohibition for each Web page with regard to the user terminal based on the RTT.

[System Configuration, etc.]

Furthermore, each component of each device illustrated is conceptual in functionality and does not necessarily need to be physically configured as illustrated in the drawings. Specifically, specific forms of separation and combination of each device are not limited to those depicted in the drawings, and a configuration may be such that all or some of them are functionally or physically separated or combined in an arbitrary unit depending on various types of loads, usage, or the like. Moreover, all or any of the various processing functions performed by each device may be implemented by a CPU and a program analyzed and executed by the CPU or may be implemented by wired logic hardware.

Among the processes that are described in the present embodiment, all or some of the processes that are automatically performed as described may be performed manually, or all or some of the processes that are manually performed as described may be performed automatically by using a well-known method. Furthermore, the operation procedures, the control procedures, the specific names, and the information including various types of data and parameters as described in the above descriptions and the drawings may be optionally changed except as otherwise noted.

[Program]

Figure 9:
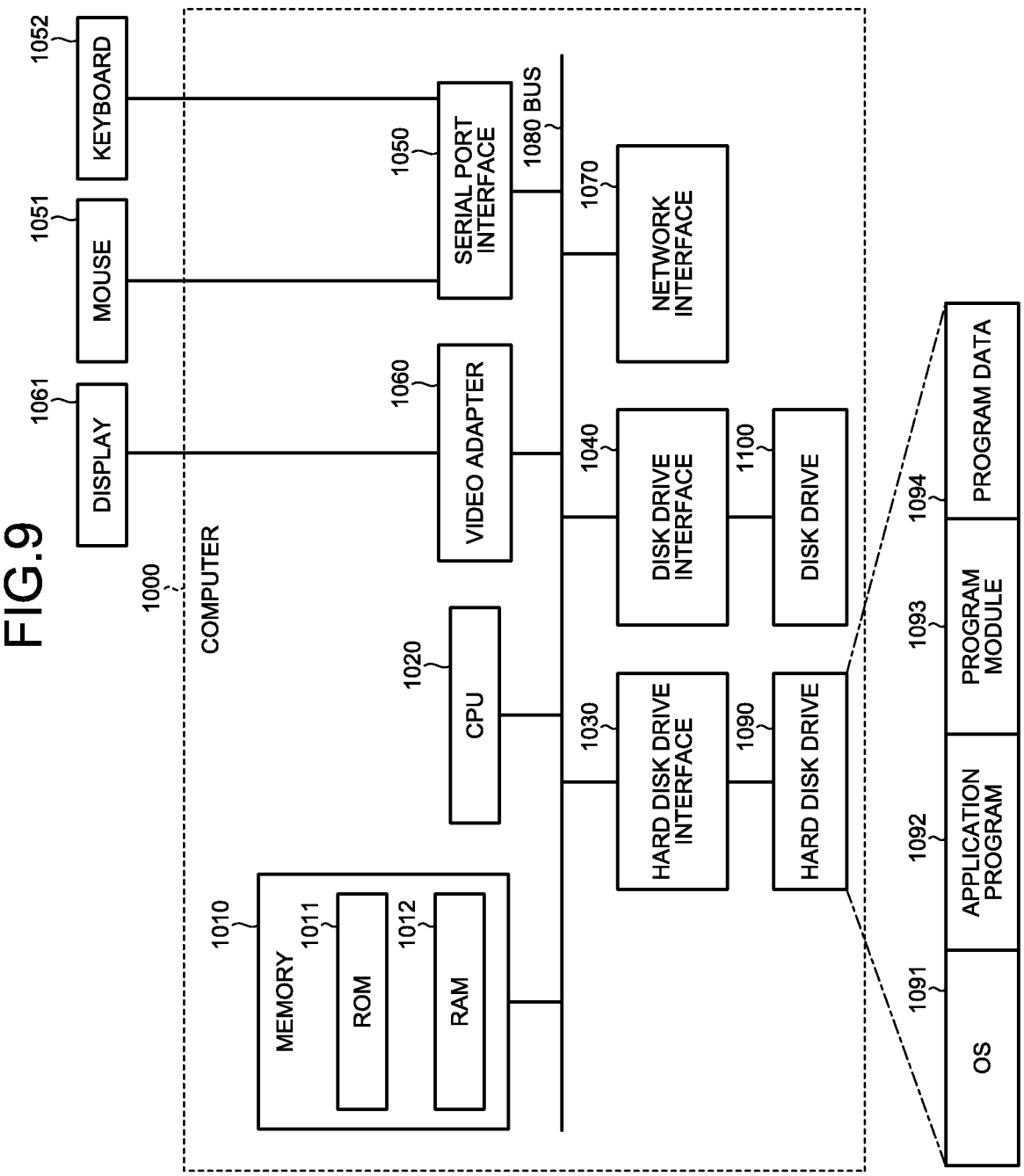
FIG. 9 is a diagram that illustrates a computer that executes an account identification program.

FIG. 9 is a diagram that illustrates a computer that executes an account identification program. A computer 1000 includes, for example, a memory 1010 and a CPU (Central Processing Unit) 1020. Furthermore, the computer 1000 includes a hard disk drive interface 1030, a disk drive interface 1040, a serial port interface 1050, a video adapter 1060, and a network interface 1070. These units are connected via a bus 1080.

The memory 1010 includes a ROM (Read Only Memory) 1011 and a RAM (Random Access Memory) 1012. The ROM 1011 stores a boot program such as BIOS (Basic Input Output System). The hard disk drive interface 1030 is connected to a hard disk drive 1090. The disk drive interface 1040 is connected to a disk drive 1100. A removable storage medium, such as a magnetic disk or an optical disk, is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. Specifically, the program defining each process of the account identification apparatus 10 is implemented as the program module 1093 in which a code executable by a computer is described. The program module 1093 is stored in, for example, the hard disk drive 1090. For example, the program module 1093 for performing the same process as that of the functional configuration of the account identification apparatus is stored in the hard disk drive 1090. Furthermore, the hard disk drive 1090 may be replaced with an SSD (Solid State Drive).

Furthermore, the setting data used in a process according to the above-described embodiment is stored as the program data 1094 in, for example, the memory 1010 or the hard disk drive 1090. Furthermore, the CPU 1020 loads the program module 1093 or the program data 1094 stored in the memory 1010 or the hard disk drive 1090 to the RAM 1012 and executes it as appropriate.

Furthermore, the program module 1093 and the program data 1094 may be stored in not only the hard disk drive 1090 but also for example a removable storage medium so as to be loaded by the CPU 1020 via the disk drive 1100, or the like. Alternatively, the program module 1093 and the program data 1094 may be stored in a different computer connected via a network or a WAN. Moreover, the program module 1093 and the program data 1094 may be loaded from the different computer by the CPU 1020 via the network interface 1070.

REFERENCE SIGNS LIST

10 ACCOUNT IDENTIFICATION APPARATUS
11 COMMUNICATION PROCESSING UNIT
12 CONTROL UNIT
12a SOCIAL-ACCOUNT LISTING UNIT
12b BROWSING-AUTHORITY SETTING UNIT
12c BROWSING-AUTHORITY ACQUIRING UNIT
12d SOCIAL-ACCOUNT IDENTIFYING UNIT
13 STORAGE UNIT
13a SOCIAL ACCOUNT DATABASE

The invention claimed is:

1. An account identification apparatus comprising:
a memory; and
a processor coupled to the memory and configured to execute a process comprising:
setting browsing authority for each of accounts such that browsing permission/prohibition is different for each of Web pages;
causing a terminal having accessed a predetermined Web site to transmit a request to each of the Web pages so as to acquire information about browsing permission/prohibition for each of the Web pages with regard to the terminal; and
using the information about browsing permission/prohibition acquired in the causing to identify an account with which the terminal has logged in, wherein
the using the information to identify the account includes generating a visitor bit sequence, in which a digit corresponding to the Web pages for which the browsing is permitted is a value and a digit corresponding to the Web pages for which the browsing is prohibited is another value, and matching the visitor bit sequence with an identification bit sequence assigned at a preparatory step so as to identify the visitor bit sequence as any one of the accounts.

2. The account identification apparatus according to claim 1, wherein the process further comprises listing identification-target accounts, wherein
the setting sets browsing authority for each of the identification-target accounts listed in the listing such that browsing permission/prohibition is different for each of the Web pages.

3. The account identification apparatus according to claim 2, wherein
the listing assigns the identification bit sequence, which is a bit sequence having a predetermined length and which is a unique identifier, to each of the listed accounts, and
the setting sets browsing authority for each of the accounts in accordance with a value of each digit of the identification bit sequence assigned in the listing such that browsing permission/prohibition is different for each of the Web pages.

4. The account identification apparatus according to claim 1, wherein
the causing acquires, as information about browsing permission/prohibition for each of the Web pages, a required time after a request is transmitted to each of the Web pages by the terminal until a response is received, and
the using estimates browsing permission or browsing prohibition for each of the pages with regard to the terminal based on the required time acquired in the causing and, in accordance with an estimation result, identifies an account with which the terminal has logged in.

5. An account identification method implemented by an account identification apparatus, the account identification method comprising:
setting browsing authority for each of accounts such that browsing permission/prohibition is different for each of Web pages;
acquiring by causing a terminal having accessed a predetermined Web site to transmit a request to each of the Web pages so as to acquire information about browsing permission/prohibition for each of the Web pages with regard to the terminal; and
identifying by using the information about browsing permission/prohibition acquired at the acquiring step to identify an account with which the terminal has logged in, wherein
the identifying includes generating a visitor bit sequence in which a digit corresponding to the Web pages for which the browsing is permitted is a value and a digit corresponding to the Web pages for which the browsing is prohibited is another value, and matching the visitor bit sequence with an identification bit sequence assigned at a preparatory step so as to identify the visitor bit sequence as any one of the accounts.

6. A non-transitory computer-readable recording medium having stored therein an account identification program causing a computer to execute a process comprising:
setting browsing authority for each of accounts such that browsing permission/prohibition is different for each of Web pages;
acquiring by causing a terminal having accessed a predetermined Web site to transmit a request to each of the Web pages so as to acquire information about browsing permission/prohibition for each of the Web pages with regard to the terminal; and
identifying by using the information about browsing permission/prohibition acquired at the acquiring step to identify an account with which the terminal has logged in, wherein
the identifying includes generating a visitor bit sequence in which a digit corresponding to the Web pages for which the browsing is permitted is a value and a digit corresponding to the Web pages for which the browsing is prohibited is another value, and matching the visitor bit sequence with an identification bit sequence assigned at a preparatory step so as to identify the visitor bit sequence as any one of the accounts.

* * * * *